United States Patent
Oldenettel et al.

(10) Patent No.: US 6,685,173 B2
(45) Date of Patent: Feb. 3, 2004

(54) AIR SPRING STRUT

(75) Inventors: Holger Oldenettel, Wedemark (DE); Ansgar Berling, Seelze (DE)

(73) Assignee: Continental Aktiengesellschaft, Hannover (DE)

( * ) Notice: Subject to any disclaimer, the term of this patent is extended or adjusted under 35 U.S.C. 154(b) by 91 days.

(21) Appl. No.: 09/996,702

(22) Filed: Nov. 30, 2001

(65) Prior Publication Data

US 2002/0063366 A1 May 30, 2002

(30) Foreign Application Priority Data

Nov. 30, 2000 (DE) .......................... 100 59 447

(51) Int. Cl.⁷ ................................. F16F 9/04
(52) U.S. Cl. ..................... 267/64.24; 267/122
(58) Field of Search .................. 267/64.19, 64.21, 267/64.23, 64.24, 64.26, 32, 122; 280/124.145, 124.154

(56) References Cited

U.S. PATENT DOCUMENTS

| | | | |
|---|---|---|---|
| 2,980,441 A | | 4/1961 | Timpner et al. |
| 3,046,000 A | * | 7/1962 | Polhemus et al. ....... 267/64.24 |
| 4,778,198 A | * | 10/1988 | Gold ....................... 267/64.24 |
| 5,129,634 A | * | 7/1992 | Harris ..................... 267/64.24 |
| 5,769,401 A | * | 6/1998 | Pradel ..................... 267/64.26 |
| 5,971,118 A | | 10/1999 | Moradian |
| 6,237,902 B1 | * | 5/2001 | Lindstrom ............... 267/64.21 |

FOREIGN PATENT DOCUMENTS

| | | |
|---|---|---|
| DE | 2100338 | 8/1972 |
| DE | 21 00 338 | 8/1972 |
| DE | 36 24 296 | 2/1987 |
| DE | 195 08 980 | 6/1996 |
| DE | 19508980 | 6/1996 |
| DE | 195 08 852 | 8/1996 |
| DE | 19642024 | 4/1998 |
| DE | 19908607 | 9/2000 |
| EP | 0259245 | 3/1988 |
| EP | 0552458 | 7/1993 |

* cited by examiner

*Primary Examiner*—Jack Lavinder
*Assistant Examiner*—Thomas J. Williams
(74) *Attorney, Agent, or Firm*—Walter Ottesen

(57) ABSTRACT

An air spring strut (4) is arranged between a vehicle axle (8) and a vehicle body (6) of a motor vehicle. The air spring strut (4) includes a shock absorber (10) and an air spring (16). The shock absorber (10) includes a cylinder (12) and a piston displaceable into the cylinder (12). The foot point (14) of the cylinder (12) can be articulately connected to a wheel-guiding component (8) and the upper end of the piston can be pivotally connected to the vehicle body (6) of a motor vehicle. The air spring (16) includes a resilient member (18) which is clamped between a cover (20) and a roll-off piston (22) while forming a rolling lobe. The cover (20) can be attached to the vehicle body (6) of a motor vehicle and the roll-off piston (22) is supported on the cylinder (12) of the shock absorber (10). The resilient member (18) of the air spring (16) is enclosed by a bell (28). The bell (28) has an approximately circular-round cross-sectional area at each cross-sectional plane and the center points of the cross-sectional areas are arranged on a curve which approximately describes a circular path segment over the largest part of a spring path of the air spring.

2 Claims, 6 Drawing Sheets

AIR SPRING STRUT

FIELD OF THE INVENTION

The invention relates to an air spring strut for mounting between a vehicle axle and a vehicle body which includes a shock absorber and an air spring and has the following features:

(a) the shock absorber includes a cylinder and a piston which is attached to a piston rod and can be pushed into the cylinder. The foot point of the cylinder can be articulately attached to a wheel-guiding component and the upper end of the piston rod can be pivotally connected to a cover of the air spring;
(b) the air spring contains a resilient member which is clamped between a cover and a roll-off piston and forms a rolling lobe. The cover can be attached to the body of the vehicle and the roll-off piston is supported on the cylinder of the shock absorber; and,
(c) the outer wall of the resilient member of the air spring is at least partially enclosed by a bell.

BACKGROUND OF THE INVENTION

Air spring struts having a shock absorber and an air spring are built into motor vehicles and function to suspend a vehicle axle with respect to the vehicle body and function to dampen the vibrations introduced into the vehicle body. A pivot movement of the air spring strut takes place when there is a deflection of a vehicle wheel relative to the vehicle body. Because of this pivot movement of the air spring strut, the air spring can be deformed in such a manner that transverse forces are applied by the air spring to the air spring strut. These transverse forces must be taken up by the shock absorber and can lead to an increased friction between the piston rod or piston and the cylinder of the shock absorber. As a consequence of the increased friction, a premature wear of the seals of the shock absorber can occur which seal the piston rod relative to the cylinder of the shock absorber. Suggestions have been made as to how the transverse forces in the air spring can be reduced with a pivot movement of the air spring strut.

An air spring strut of the kind referred to initially herein is disclosed in U.S. Pat. No. 5,667,203. In this air spring strut, the roll-off piston of the air spring is mounted so as to be wobbly movable on the cylinder of the shock absorber. For a pivot movement of the air spring strut, the wobbly movable arrangement of the roll-off piston makes possible a pivot movement of the roll-off piston relative to the cylinder of the shock absorber. This pivot movement leads to the situation that the resilient member of the air spring forms an almost rotationally symmetrical roll-off lobe in every deflection condition of the air spring strut. The resilient member of the air spring is surrounded by a bell. For this reason, the transverse forces occurring in the air spring and the transverse forces introduced into the shock absorber by the air spring are reduced.

However, in the air spring strut disclosed in U.S. Pat. No. 5,667,203, it can happen that there is contact between the roll-off piston and the part of the resilient member of the air spring which is braced on the bell of the air spring when there is a large pivot movement of the roll-off piston of the air spring relative to the cylinder of the shock absorber. The contact can lead to damage of the resilient member of the air spring. This is especially then the case when the air spring piston plunges deep into the air spring. A further disadvantage of the air spring strut known from the above publication is that the roll-off piston of the air spring must reach far up to the lower end of the cylinder of the shock absorber so that pivot movements between the roll-off piston and the cylinder are possible without an angular offset of the roll-off piston which is too great (a large angle offset between the roll-off piston and the cylinder would be disadvantageous because a collision could occur between the roll-off piston and the cylinder or between the roll-off piston and the bell). In the lower region of the air spring strut, this can lead to problems of space for equipment especially when other components such as sensors, et cetera, are intended to be provided in this region.

SUMMARY OF THE INVENTION

It is an object of the invention to provide an air spring strut wherein transverse forces as low as possible are introduced into the shock absorber of the air spring strut when there is a pivot movement of the lower end of the air spring strut and wherein damage of the resilient member of the air spring is prevented as far as possible.

The air spring strut of the invention is for mounting between a vehicle axle and a body of a vehicle. The air spring strut includes: a shock absorber including a cylinder, a piston rod having a first end and a second end, a piston connected to the piston rod at the first end thereof and being displaceable in the cylinder; an air spring including a cover attached to the vehicle and a roll-off piston supported on the cylinder of the shock absorber; the cylinder having a foot point articulately connected to the axle and the second end of the piston rod being pivotally connected to the cover; the air spring further including a resilient member clamped between the roll-off piston and the cover and the resilient member forming a rolling lobe during operation of the vehicle; the resilient member having an outer surface; a bell enclosing at least a portion of the outer surface of the resilient member; the bell being so configured that each cross section thereof has an approximately circular cross-sectional area defining a center point; and, the center points of all of the cross-sectional areas being disposed along a curve defining approximately a circular path segment over the largest part of the excursion path described by the air spring during deflection thereof.

When the vehicle axle of a motor vehicle contracts and expands relative to the vehicle body, the foot point of the air spring strut, which is mounted between the vehicle axle and the vehicle body, and the roll-off piston of the air spring of the air spring strut describe a circular path segment. The curve, on which the center points of the cross-sectional areas of the bell are arranged, is preferably so selected that it corresponds approximately to the circular path segment which the roll-off piston of the air spring describes for a compressive deflection or expansive deflection of the vehicle axle relative to the vehicle body.

The advantage of the invention is especially that the rolling lobe of the air spring has an approximately rotationally symmetrical cross section in each deflection state of the air spring so that small bending radii of the resilient member, which could lead to damage thereof, are substantially avoided in the region of the rolling lobe. Furthermore, the transverse forces, which are built up within the air spring, are low. For a compressive and expansive deflection of the air spring, the rolling lobe of the air spring assumes an inclined position because of the configuration of the bell in accordance with the invention which encloses the resilient member of the air spring. This is seen as an additional advantage of the invention. Because of the inclined position, the spring force, which is applied by the air spring, runs approximately along the longitudinal axis of the shock absorber of the air spring strut so that no transverse forces are introduced into the air spring strut by the spring force applied by the air spring. In the air spring strut according to the invention, it is a further advantage of the invention that the problem is not present that the roll-off piston of the air spring contacts that part of the resilient member which is braced on the bell of the air spring because the course of the bell corresponds to the path of movement of the roll-off piston. A further advantage of the invention is that a wobbly movable arrangement of the roll-off piston of the air spring on the cylinder of the shock absorber, and therefore the elastic bearing associated therewith, is not necessary whereby the cost of the air spring strut is reduced. A further advantage of the invention is that the roll-off piston of the air spring can be attached at the upper end of the cylinder of the shock absorber so that adequate space for other components is available in the region of the lower end of the cylinder of the shock absorber.

According to another feature of the invention, the diameters of the approximately circular-shaped cross-sectional areas become greater toward the foot point of the air spring strut. The advantage of this embodiment becomes understandable when one considers the following, namely, the bell, which encloses the resilient member of the air spring, can be produced with the aid of a form-imparting core in an especially simple manner (for example, in a casting process) and this core is pulled out after the completion of the bell. The advantage of this embodiment is that the core can be easily removed from the bell when the bell expands toward one end which is achieved with this embodiment.

According to another feature of the invention, the roll-off piston of the air spring is curved. The center curvature line lies on the curve on which the center points of the cross-sectional areas of the bell lie. The advantage of this feature is that the roll-off piston and the bell are optimally adapted to each other and a substantially rotational symmetrical configuration of the roll-off lobe of the resilient member is guaranteed in each deflection state of the air spring.

According to another feature of the invention, the roll-off piston of the air spring is inclined relative to the longitudinal axis of the shock absorber. The advantage of this embodiment will become clear when one considers the following. The circular path section, on which the center points of the cross-sectional areas of the bell lie, has a large radius of curvature and can be approximated by a straight line in a first approximation. The roll-off piston can be positioned inclined relative to the longitudinal axis of the shock absorber so that its center axis runs along this straight line. The advantage of this embodiment is that a simple but nonetheless adequate adaptation of the roll-off piston to the circular path segment is possible because of an inclined position of the roll-off piston. The center points of the cross-sectional areas of the bell lie on the circular path section.

BRIEF DESCRIPTION OF THE DRAWINQS

The invention will now be described with reference to the drawings wherein.

DESCRIPTION OF THE PREFERRED EMBODIMENTS OF THE INVENTION

Figure 1:
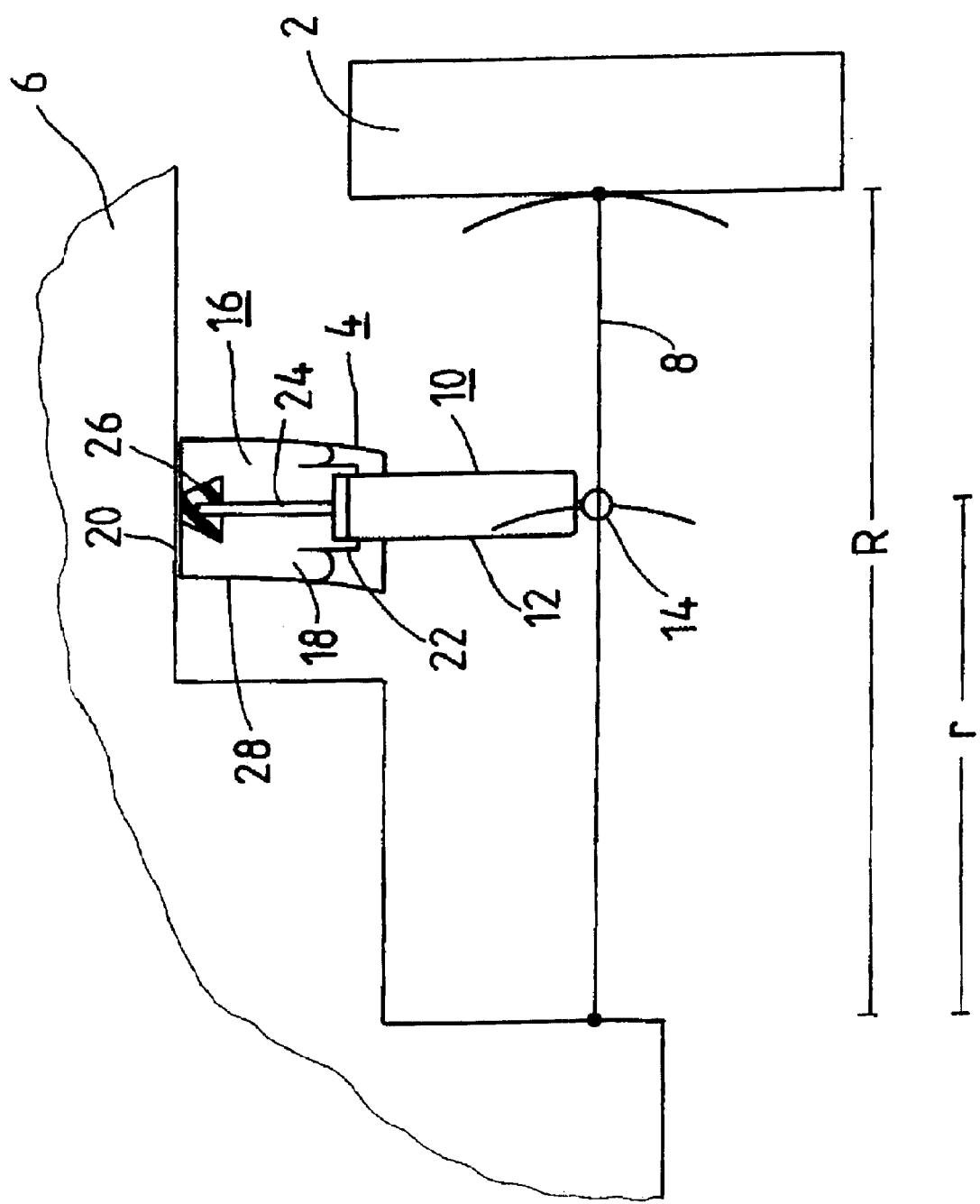
FIG. 1 shows a wheel which is resiliently journalled relative to a chassis body of a motor vehicle by means of an air spring strut.

FIG. 1 schematically shows a wheel 2 of a motor vehicle which is resiliently supported by an air spring strut 4 relative to a vehicle body 6 of a motor vehicle. The wheel 2 is rotatably journalled on a wheel-guiding component in the form of an axle 8. The air spring strut 4 includes a rotationally-symmetrical shock absorber 10 having a cylinder 12 whose foot point 14 is articulately connected to the axle 8. The articulate connection between the foot point 14 with the axle 8 can, for example, be provided by an elastomeric component or by a ball joint with which the axle 8 is guided. Furthermore, the air spring strut 4 includes an air spring 16 having a resilient member 18 which is clamped between a cover 20 and a roll-off piston 22 of the air spring while forming a rolling lobe and is surrounded by a bell 28. The cover 20 of the air spring 16 is attached to the vehicle body 6 of the motor vehicle and the roll-off piston 22 of the air spring is supported on the cylinder 12 of the shock absorber 10. A piston (not shown) is displaceable into the cylinder and is connected to a piston rod 24 which projects out of the cylinder 12 in the direction of the vehicle body 6. The upper end of the piston rod 24 is connected via an elastomeric bearing 26 to the cover 20 of the air spring 16.

When the wheel 2 compressively and expansively deflects relative to the vehicle body 6 of the motor vehicle, the wheel describes a circular path segment. The circular path has approximately the radius R. The transverse forces imparted by the wheel are directed through the axle 8 directly into the vehicle body 6 and must be taken up by the point at which the axle 8 is attached to the vehicle body 6. An introduction of this transverse force into the air spring strut 4 does not take place since the air spring strut 4 can avoid the transverse forces because of the articulate connection of its foot point to the axle 8. In contrast thereto, the McPherson air spring strut is fixedly attached at its foot point to the component guiding the wheel so that it must also be able to take up the transverse forces imparted by the wheel 2.

The foot point 14 of the cylinder 12 or of the shock absorber 10 likewise describes a circular path segment. This circular path has approximately a radius r. The piston rod 24 of the shock absorber 10 is pivoted in the elastomeric bearing 26 because of the movement of the foot point 14 on the circular path segment having the radius r. Furthermore, the roll-off piston 22 of the air spring 16 likewise moves on a circular path section when the wheel 2 is compressively or expansively deflected relative to the vehicle body 6 of the motor vehicle.

The bell 28, which encloses the resilient member 18 of the air spring 16, has an approximately circular cross-sectional area in each cross-sectional plane (that is, in the plane whose surface normal corresponds to the center axis of the shock absorber 10). Furthermore, the rolling lobe of the air spring positions itself approximately so in each deflecting state that the air spring force acts along the longitudinal axis of the shock absorber 10 and therefore on the foot point 14 of the air spring strut and is taken up thereby. Accordingly, no transverse forces are directed into the air spring by the air spring force. In this way, it is ensured that the rolling lobe of the resilient member 18 of the air spring 16 is approximately rotationally symmetrically configured in each deflecting state of the air spring strut so that no transverse forces are built up in the air spring 16. The center points of the cross-sectional areas lie approximately on the circular path segment 29 which is described by the roll-off piston 22 for a compressive or expansive deflection of the air spring strut 4. The circular path segment 29 has the radius R.

In the bell 28 shown in FIG. 1, the approximately circular-round cross-sectional areas all have approximately the same radius so that the bell 28 has the curved form shown.

Figure 2:
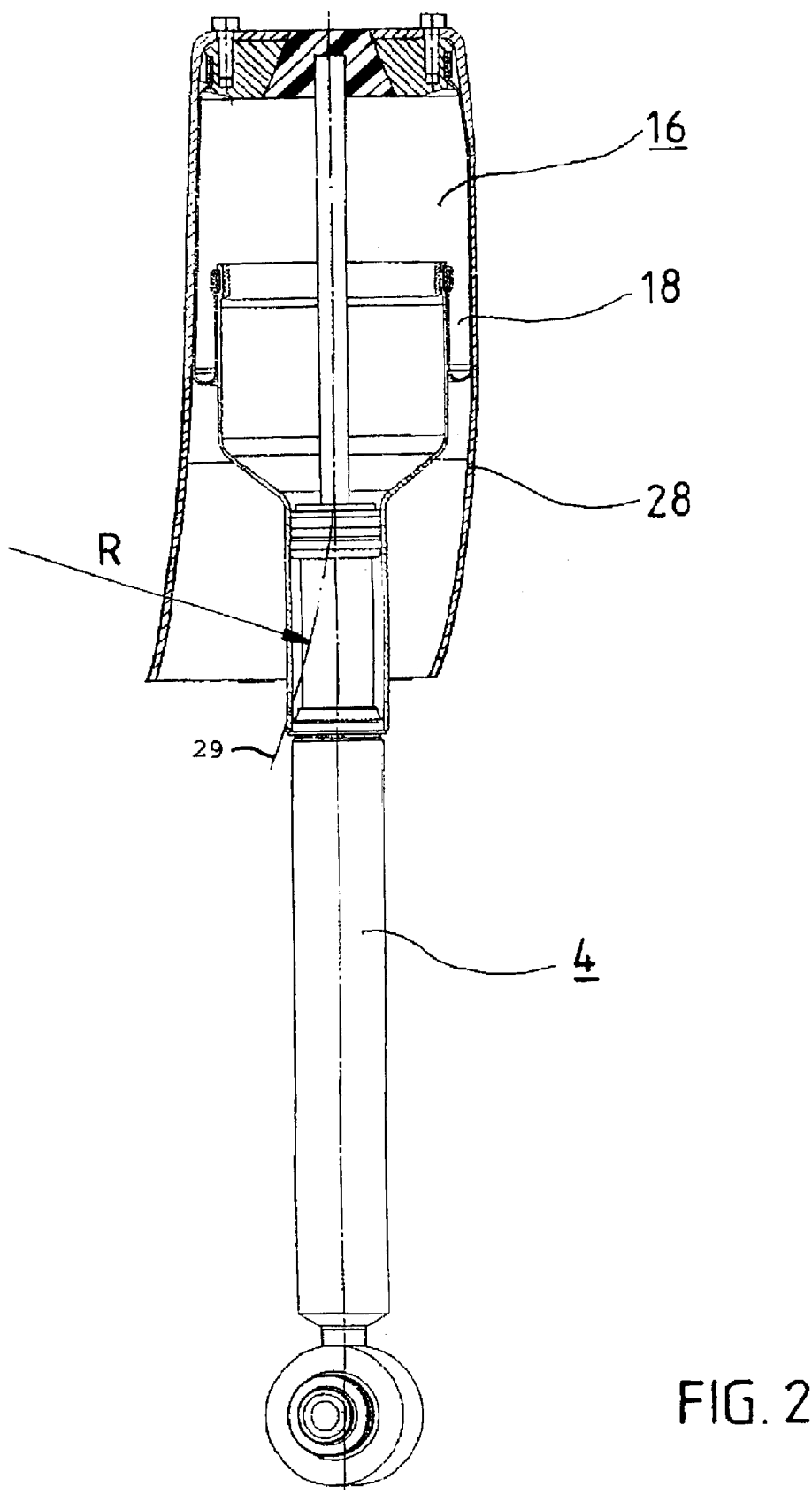
FIG. 2 is a side elevation view, in section, of a first embodiment of an air spring strut.

FIG. 2 shows the air spring strut 4 in detail which is schematically represented in FIG. 1. The bell 28 surrounds the resilient member 18 of the air spring 16 and has an approximately circular-round cross-sectional area in each cross-sectional plane. The center points of the cross-sectional areas are arranged on a curve which defines approximately a circular path segment as shown in FIG. 2. The radii of the approximately circular-round cross-sectional areas are all approximately the same size so that the bell 28 is curved in correspondence to the circular path segment on which the center points of the cross-sectional areas lie.

Figure 3:
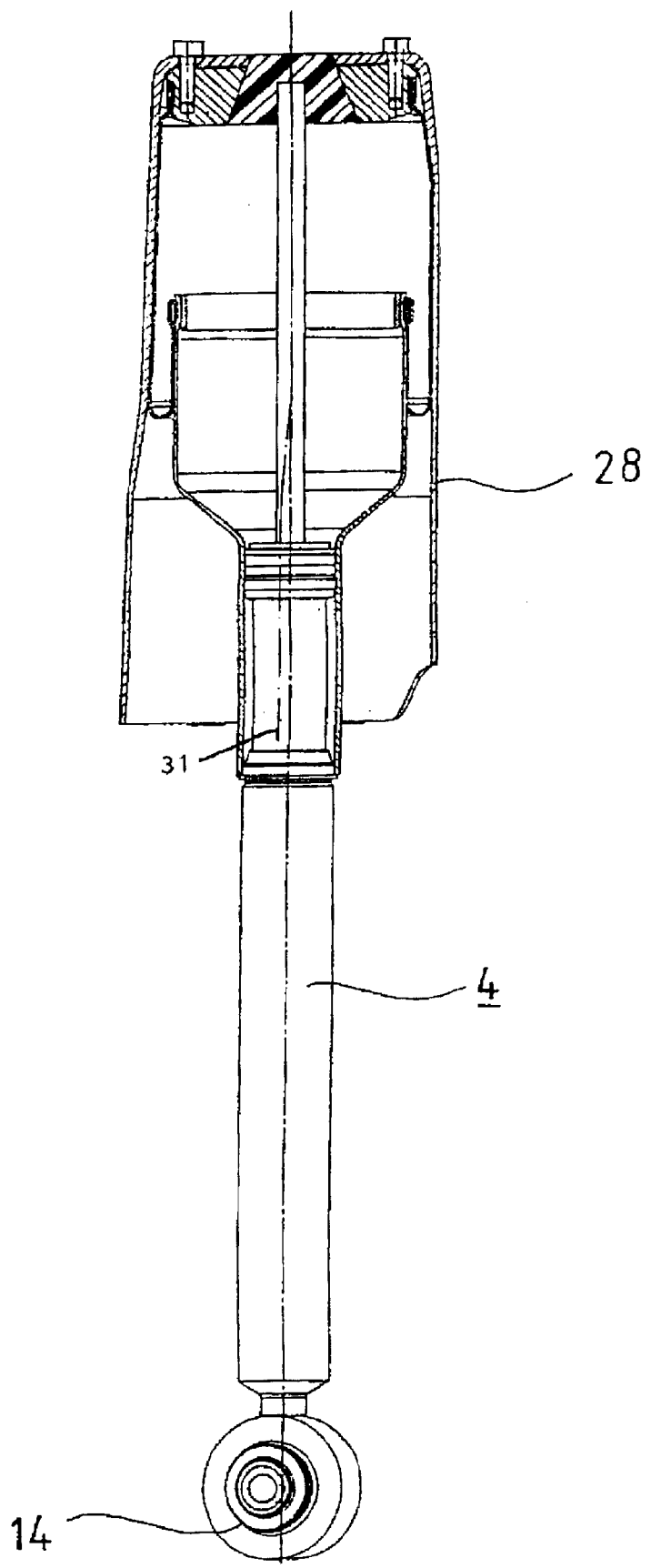
FIG. 3 is a side elevation view, in section, of a second embodiment of an air spring strut.
Figure 3A:
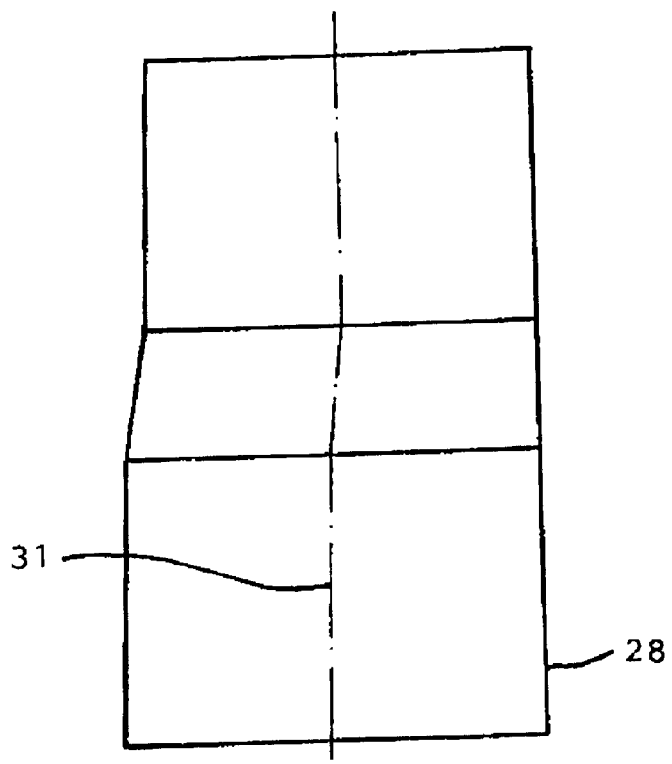
FIG. 3a is an enlarged detail view of a portion of the bell of the air spring of the air spring strut of FIG. 3.

FIG. 3 shows a further embodiment of the air spring strut 4 which distinguishes from the embodiment shown in FIG. 2 in that the radii of the approximately circular-round cross-sectional areas of the bell 28 become larger toward the foot point 14 of the air spring strut 4. As can be seen in FIG. 3, the center axis 31 of the bell 28 is nonlinear. FIG. 3a is an enlarged detail view of a portion of the bell 28 of FIG. 3 and more clearly shows the nonlinear center axis 31.

Figure 4:
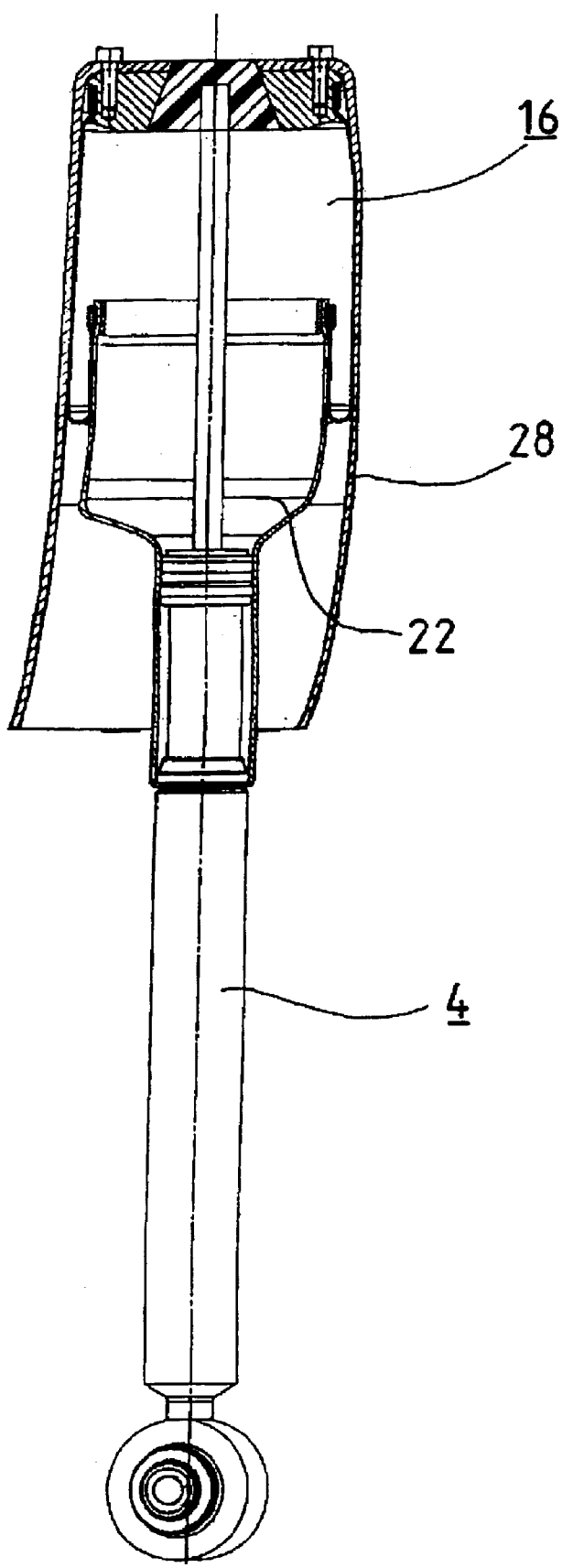
FIG. 4 is a side elevation view, in section, of a third embodiment of an air spring strut; and, FIG. 5 is a side elevation view, in section, of a fourth embodiment of an air spring strut.

FIG. 4 shows another embodiment of the air spring strut 4 which corresponds substantially to the embodiment of FIG. 2. The only difference is that the roll-off piston 22 of the air spring 16 is curved in the embodiment of FIG. 4. The center curvature line corresponds to a circular path section which corresponds approximately to the circular path section which is approximately coincident to the circular path section on which the center points of the circular-round cross-sectional areas of the bell 28 lie. The air spring strut 4, which is shown in FIG. 4, can also be provided with a bell in accordance with the embodiment of FIG. 3.

Figure 5:
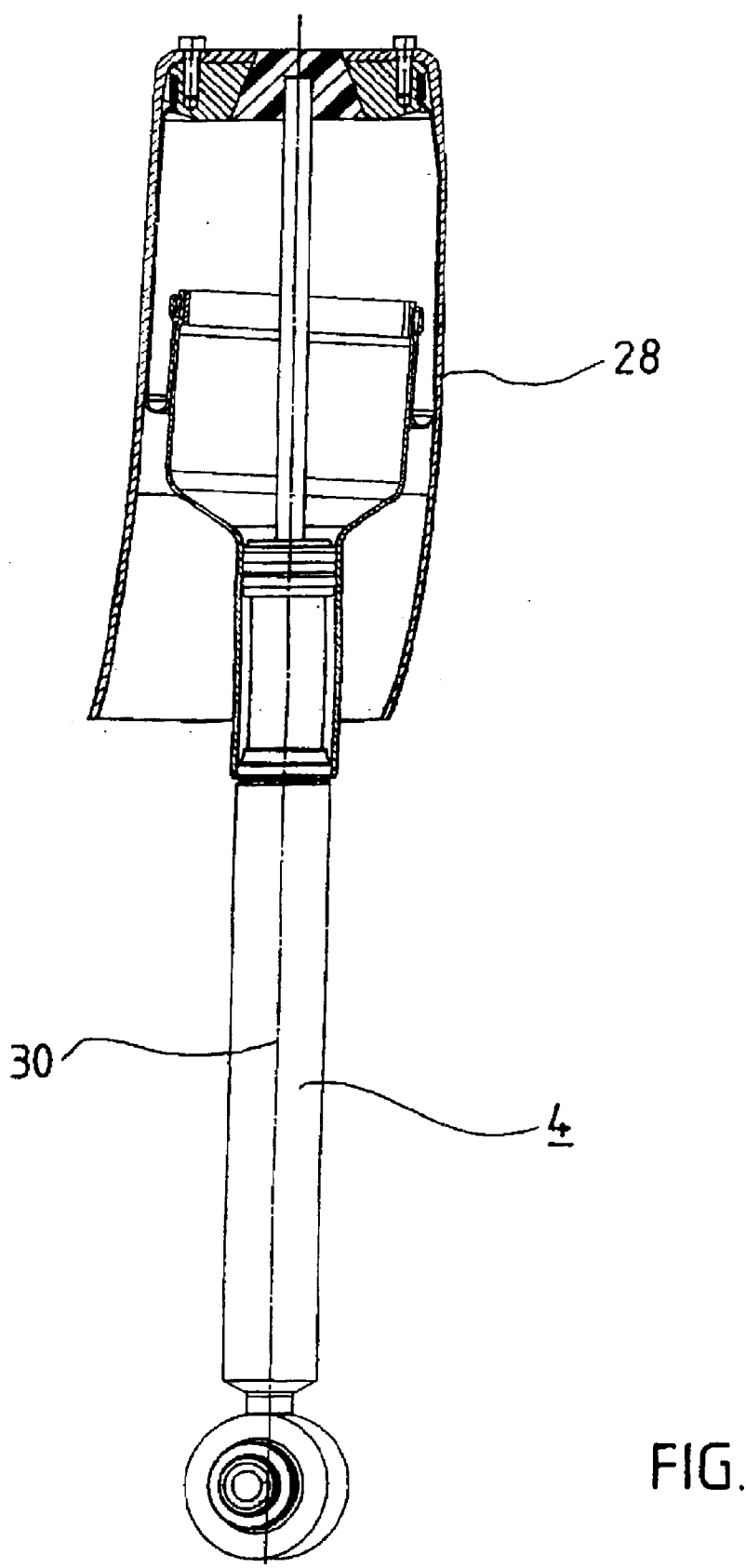

FIG. 5 shows an embodiment of an air spring strut 4 which likewise corresponds substantially to the air spring strut shown in FIG. 2. The only difference is that the roll-off piston 22 is positioned inclined relative to the longitudinal axis 30 of the shock absorber 10. The inclined position of the air spring strut takes place in such a manner that the center axis of the roll-off piston runs as close as possible to the circular path section on which the center points of the cross-sectional areas of the bell 28 lie. In the embodiment shown in FIG. 5, the curved bell 28 can also be replaced by the bell shown in FIG. 3.

It is understood that the foregoing description is that of the preferred embodiments of the invention and that various changes and modifications may be made thereto without departing from the spirit and scope of the invention as defined in the appended claims.

What is claimed is:

1. An air spring strut for mounting between a vehicle axle and a body of a vehicle, the air spring strut comprising:

a shock absorber including a cylinder, a piston rod having a first end and a second end, a piston connected to said piston rod at said first end thereof and being displaceable in said cylinder;

an air spring including a cover attached to said vehicle and a roll-off piston supported on said cylinder of said shock absorber;

said cylinder having a foot point articulately connected to said axle and said second end of said piston rod being pivotally connected to said cover;

said air spring further including a resilient member clamped between said roll-off piston and said cover and said resilient member forming a rolling lobe during operation of said vehicle;

said resilient member having an outer surface;

a bell having an annular side wall enclosing at least a portion of said outer surface of said resilient member and said annular side wall defining a nonlinear center axis;

said bell being so configured that each cross section thereof has an approximately circular cross-sectional area defining a center point on said axis;

the center points of all of the cross-sectional areas being disposed along said axis defining approximately a nonlinear path segment over the largest part of the excursion path described by said air spring during deflection thereof;

said cross-sectional areas having respective diameters which become greater in a direction toward said foot point; and, said roll-off piston being curved and said axis being a center line of curvature coincident with said curve on which said center points of said cross-sectional areas lie.

2. An air spring strut for mounting between a vehicle axle and a body of a vehicle, the air spring strut comprising:

a shock absorber including a cylinder, a piston rod having a first end and a second end, a piston connected to said piston rod at said first end thereof and being displaceable in said cylinder;

an air spring including a cover attached to said vehicle and a roll-off piston supported on said cylinder of said shock absorber;

said cylinder having a foot point articulately connected to said axle and said second end of said piston rod being pivotally connected to said cover;

said air spring further including a resilient member clamped between said roll-off piston and said cover and said resilient member forming a rolling lobe during operation of said vehicle;

said resilient member having an outer surface;

a bell having an annular side wall enclosing at least a portion of said outer surface of said resilient member and said annular side wall defining a nonlinear center axis;

said bell being so configured that each cross section thereof has an approximately circular cross-sectional area defining a center point on said axis;

the center points of all of the cross-sectional areas being disposed along said axis defining approximately a nonlinear path segment over the largest part of the excursion path described by said air spring during deflection thereof; and, said shock absorber defining a longitudinal axis and said roll-off piston being inclined relative to said longitudinal axis of said shock absorber.

* * * * *